US010708224B2

(12) United States Patent
Lundberg et al.

(10) Patent No.: US 10,708,224 B2
(45) Date of Patent: Jul. 7, 2020

(54) ADDRESSING IN A SYSTEM OF INTERCONNECTED UNITES

(71) Applicant: Telefonaktiebolaget LM Ericsson (publ), Stockholm (SE)

(72) Inventors: Jan-Erik Lundberg, Sollentuna (SE); Curt Olsson, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 168 days.

(21) Appl. No.: 15/763,437

(22) PCT Filed: Sep. 30, 2015

(86) PCT No.: PCT/SE2015/051036
§ 371 (c)(1),
(2) Date: Mar. 26, 2018

(87) PCT Pub. No.: WO2017/058071
PCT Pub. Date: Apr. 6, 2017

(65) Prior Publication Data
US 2018/0287994 A1    Oct. 4, 2018

(51) Int. Cl.
*H04L 29/12* (2006.01)
*H04L 12/24* (2006.01)
*H04L 29/08* (2006.01)

(52) U.S. Cl.
CPC ...... *H04L 61/2038* (2013.01); *H04L 61/6004* (2013.01); *H04L 61/6022* (2013.01); *H04L 41/12* (2013.01); *H04L 69/324* (2013.01)

(58) Field of Classification Search
CPC . H04L 41/12; H04L 61/2038; H04L 61/6004; H04L 61/6022; H04L 69/324
See application file for complete search history.

(56) References Cited

U.S. PATENT DOCUMENTS

| | | | | |
|---|---|---|---|---|
| 5,805,595 A | * | 9/1998 | Sharper | H04J 3/247 370/442 |
| 6,757,279 B1 | * | 6/2004 | Furlong | H04L 12/4641 370/387 |
| 6,801,527 B1 | * | 10/2004 | O'Keeffe | H04L 45/745 370/386 |
| 6,801,950 B1 | * | 10/2004 | O'Keeffe | H04L 45/00 709/238 |
| 6,807,182 B1 | * | 10/2004 | Dolphin | H04L 45/00 370/401 |

(Continued)

OTHER PUBLICATIONS

International Search Report and Written Opinion for International Application No. PCT/SE2015/051036, dated Jun. 9, 2016, 9 pages.

(Continued)

*Primary Examiner* — Joe Chacko
(74) *Attorney, Agent, or Firm* — Patent Portfolio Builders, PLLC (57) ABSTRACT

A controlling unit retrieves information regarding system interconnect topology and assigns unique address to all connected units without the need for any prior configuration. An added unit with cascading ports will be able to use the address assignment that enables the controller to avoid address collisions between connected units. In short, the disclosure provides the system of interconnected units with a "plug and play" capability.

21 Claims, 4 Drawing Sheets

(56) References Cited

U.S. PATENT DOCUMENTS

| | | | |
|---|---|---|---|
| 2008/0037531 A1* | 2/2008 | Donoghue | H04L 12/433 |
| | | | 370/386 |
| 2009/0157854 A1* | 6/2009 | Balandin | H04L 29/12254 |
| | | | 709/220 |
| 2010/0250717 A1 | 9/2010 | Akagi | |
| 2011/0258343 A1 | 10/2011 | Kettunen | |
| 2013/0156045 A1* | 6/2013 | Hu | H01Q 3/005 |
| | | | 370/449 |
| 2013/0282941 A1* | 10/2013 | van Dijk | H04L 12/403 |
| | | | 710/110 |
| 2016/0255001 A1* | 9/2016 | Wang | H04L 12/6418 |
| | | | 370/392 |

OTHER PUBLICATIONS

Jan Axelson, "Jan Axelson's Lakeview Research," Mar. 2015, 8 pages, downloaded from http://janaxelson.com/usbcenum. htm#Continue.

3GPP TS 25.462, "3rd Generation Partnership Project; Technical Specification Group Radio Access Network; UTRAN luant interface: Signalling transport (Release 12)," Sep. 2014, 21 pages, V12.0.0, 3GPP Organizational Partners.

Office Action issued in corresponding EP Application No. 15780964. 1; dated Jun. 4, 2019; 05 pages. The reference not cited therein has been previously made of record.

* cited by examiner

ADDRESSING IN A SYSTEM OF INTERCONNECTED UNITES

CROSS-REFERENCE TO RELATED APPLICATIONS

This application is a National stage of International Application No. PCT/SE2015/051036, filed Sep. 30, 2015, which is hereby incorporated by reference.

TECHNICAL FIELD

Embodiments herein relate to controlling addressing of units in a system of interconnected units having communication ports that have a cascading function.

BACKGROUND

Systems of interconnected electronic units, for example wireless communication systems, typically comprise interconnected units such as transmitters, receivers, power supply units, fan control units etc. that need to communicate on the data link layer, i.e. layer 2 of the Open Systems Interconnection (OSI) model. For example, such systems, here called master-slave systems, may be characterized by one controlling and a flexible number of controlled units often connected to each other by means of a bus topology. A bus topology has a good scalability and is typically cost effective when considering larger systems.

Examples of protocols that are used in the link layer include the high-level data link control (HDLC) protocol, defined in the International Organization for Standardization (ISO)/International Electrotechnical Commission (IEC) standard ISO/IEC13239 and the Ethernet protocol which also is used for other topologies (ring, star, tree and mesh).

In order to enable a controller to individually control a specific unit, an addressing mechanism is essential. Examples of this are the address assignment procedures in the $I_{uant}$ interface defined by the third generation partnership project (3GPP) in TS 25.462 and the media access control (MAC) addresses used in Ethernet based systems.

One approach to assign unique addresses in HDLC based system is to differentiate between types of units. For example, a power supply unit uses one fixed address and a fan control unit another. However, such an approach does not work if the controller has to control more than one unit of the same type. Another approach is to assign a unit an address by means of, e.g., manually operated dipswitches. These approaches can also be combined. A unit knows its type and can also read the dipswitches to calculate its unique address. A control system that is aware of the addressing rules can communicate with all units in the system as long as the unit addressing is unique.

Ethernet based systems uses MAC addressing, typically in combination with transport control protocol/internet protocol (TCP/IP), which secures that all units at the time of manufacturing are assigned a worldwide unique address. These protocols were developed to implement communication ability for complex systems and are thus not cost optimized to achieve communication within a master-slave system with one controlling unit and a number of controlled units.

One drawback with these master-slave systems, i.e. systems that are less complex than the typical Ethernet/TCP/IP systems, is that there is no built in mechanism to provide information to the controller where a controlled unit is physically located. For small systems with few units placed in near proximity to each other this is not a major problem. However for larger systems where the controlled units are located at geographically different locations it may be time consuming and costly to find and replace a failing unit. For a bus oriented system it is also cumbersome to configure added units in a system extension scenario, because of address dependencies of already connected units.

Another drawback with these master-slave systems becomes apparent when a specific unit (of the same type) is providing a specific service for the controller of another system. Then the physical placement and identity is critical to provide the correct functionality. An example of this is cascaded remote electrical tilting (RET) antennas operating according to 3GPP TS 25.462 (i.e. the $I_{uant}$ interface). In this case the controller must be configured to know a unique identifier for each specific unit and also to know which specific service, in another system, it is used. If this configuration is done manually, e.g. by use of dipswitches, there is a risk of entering errors with the result that the system behavior will not be the wanted one. An automated design to solve the problem can be complex in its nature and thus costly to develop and maintain. Furthermore, such a design cannot be generic because it must be based on the analyzing of whether the system works as intended, if it was correctly configured, or if it is not working as intended, how the system shall be reconfigured to perform properly.

A further drawback with systems involving dipswitches is that the manual setting of the dipswitch must match how the controller is configured, in order to enable successful communication. If two units are configured with the same dipswitch setting the controller cannot communicate with any of the two units. Another drawback is that dipswitches may be costly and take critical front space on units.

For other units than 3GPP $I_{uant}$ compliant units it is possible to perform address assignment that avoids physical dipswitches. For example, each type of a controlled unit may be assigned a predefined address range, which together with a number of extra address bits supplied by a hub unit (to which each controlled unit must be connected), enables the controlled unit to calculate its unique address and thereby be able to respond to messages addressed to the unit.

A drawback with such an approach is that the controller unit software needs to be configured to know to which port in the hub a unit is connected to in order to be able to calculate the expected HDLC address the unit will respond to. Thus, if the unit is not connected to the hub in the same way as the control software is configured, the communication will fail. Moreover, it is awkward to expand such a system to more than one hub unit because, when the same type of unit is connected to the corresponding connector port with the same address bits on a second hub unit, the addresses will collide and make the communication impossible with these units.

SUMMARY

In view of the above, an object of the present disclosure is to overcome or at least mitigate at least some of the drawbacks related to addressing in a system of interconnected units.

This object is achieved in one aspect by a method performed by a controlling unit in a system of interconnected units, where each of said units comprises at least one port via which said interconnection is realized and where at least a subset of said interconnected units comprises at least one cascading port, said method comprising a system start-up procedure that comprises transmitting at least one first request for information to at least one port on the controlling unit. A response to said first request is received from a first unit. The response from the first unit comprises information that identifies the first unit and further comprises information that identifies at least one cascading port on the first unit. A second request for information is then transmitted to the at least one cascading port on the first unit. A response to the second request is received from a second unit. The response from the second unit comprises information that identifies the second unit and further comprises information that identifies any cascading port on the second unit. A respective unique address associated with the first unit and the second unit is assigned, and the assigned unique addresses are recorded together with the information that identifies the first and second units and the information that identifies at least one cascading port on the first and second units. Then the recorded unique addresses are transmitted to the first unit and to the second unit.

Further requests may be transmitted to further cascading ports on further units and a respective response may be received from these further units. These respective responses may comprise information that identifies respective further unit and further comprising respective information that identifies any cascading port on respective further unit. Then, a respective unique address may be assigned that is associated with respective further unit and the assigned unique addresses may be recorded together with the information that identifies respective further unit. The recorded unique addresses are then transmitted to respective further unit.

In other words, the controlling unit retrieves information regarding the system interconnect topology and assigns unique address to all connected units without the need for any prior configuration. The need, in prior art, to configure the controlling unit software with information of how a unit is connected to a specific cascading port with unique address is thereby removed. The method makes it simple and robust to expand a system with a unit having cascading ports, such as a hub unit with a fixed address assignment, with additional units with cascading ports. An added unit with cascading ports will be able to use the address assignment that enables the controller to avoid address collisions between connected units. In short, the method provides a system of interconnected units with a "plug and play" capability.

In some embodiments, an order is transmitted to a specific unit, the order comprising information for instructing the specific unit to allow a request transmitted by the controlling unit to be transmitted on a cascading port on the specific unit.

In some embodiments, the addresses may comprise a respective first address part defined by a type of unit and a second address part defined by an address offset that is port related.

In some embodiments, any transmission of any request for information may comprise an iteration of transmissions to addresses selected from a predetermined set of addresses. In these embodiments, an address from which a response is received may be removed from the predetermined set of addresses.

In some embodiments, the units in the system may be configured to interconnect according to a HDLC protocol and any transmission of a request for information may then comprise transmitting a HW_PID_REQ message and any response to any HW_PID_REQ may be a HW_PID_CFM message.

Another aspect of the present disclosure is a controlling unit that comprises input/output circuitry, a processor and a memory. The memory contains instructions executable by the processor whereby the controlling unit is operative to:

transmit at least one first request for information to at least one port on the controlling unit,     receive, from a first unit, a response to the first request, the response comprising information that identifies the first unit, the information further comprising information that identifies at least one cascading port on the first unit,     transmit a second request for information to the at least one cascading port on the first unit,     receive, from a second unit, a response to the second request, the response comprising information that identifies the second unit, the information further comprising information that identifies any cascading port on the second unit,     assign a respective unique address associated with the first unit and the second unit,     record the assigned unique addresses together with the information that identifies the first and second units and the information that identifies at least one cascading port on the first and second units, and     transmit the recorded unique addresses to the first unit and to the second unit.

In other aspects there are provided computer programs comprising instructions which, when executed on at least one processor in a controlling unit, cause the controlling unit to carry out the method according to the aspect summarized above.

In other aspects there are provided carriers comprising a computer program according to the summarized aspect above, wherein the carrier is one of an electronic signal, an optical signal, a radio signal and a computer readable storage medium.

These other aspects provide the same effects and advantages as the method aspect summarized above.

DETAILED DESCRIPTION

Figure 1:
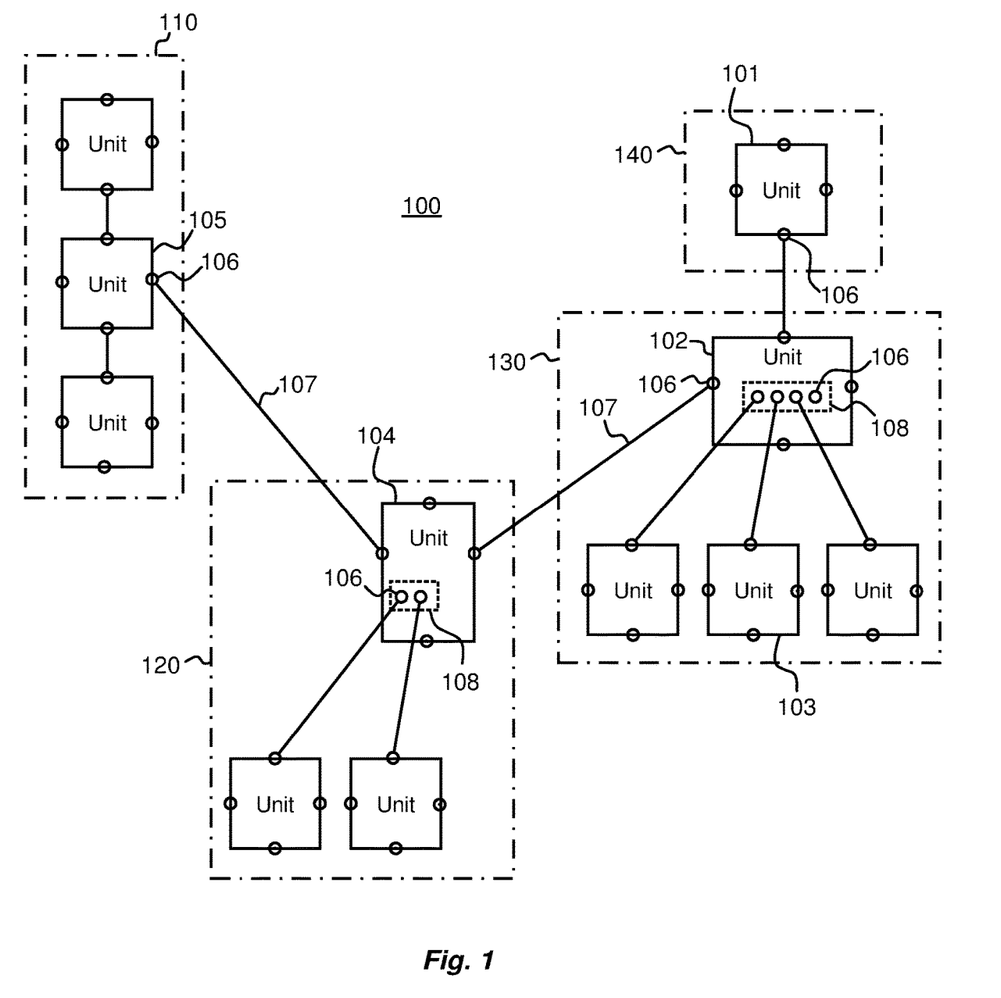
FIG. 1 schematically illustrates a system of interconnected units.

FIG. 1 illustrates schematically a system 100 of interconnected units. The units are illustrated as solid rectangles and squares (and labeled with "Unit") and some of which are denoted with reference numerals 101, 102, 103, 104 and 105. As mentioned, the units may be any combination of transmitters, receivers, power supply units, fan control units etc. that need to communicate on the data link layer in a communication system. The units are distributed geographically at four different locations, illustrated as dot-dashed rectangles denoted with reference numerals 110, 120, 130 and 140.

All units have a number of ports. The ports are illustrated as small circles and some of which are denoted with reference numeral 106. The units may be interconnected via connections, illustrated as a solid line and one of which is denoted with reference numeral 107.

In the following, unit 101 will be referred to as a controlling unit that performs embodiments of the present disclosure. It is to be noted, however, that any unit may be a controlling unit.

Some ports are grouped, illustrated as a dotted rectangle and one of which is denoted with reference numeral 108. Grouped ports need to be handled in a common way by the controlling unit 101. A unit having more than one port that are grouped, i.e. a unit with no functionality other than connecting functionality, may be referred to as a hub unit.

Each port and port group is assigned with a logical attribute at time of manufacturing of the unit. The attribute has a meaning of the location of the unit that is intended to be connected to it. The port (or group of ports) with a specific logical attribute can also be using a specific physical connector (e.g. a cable), or connector marking and/or position on the unit making it trivial at system installation to make a correct physical interconnection that mirrors the logical location attribute. This approach enables the controlling unit 101 to perform a topology discovery during start-up and correct system configuration based on a trivial physical cabling procedure at system installation. The controlling unit 101 may use this attribute to visualize the configuration after the start-up procedure is ended.

As will be more fully described below with reference to flowcharts that illustrate embodiments of methods, units (excluding the controlling unit 101) may listen to messages on all of its ports. A unit may respond on all of its ports as the response message cannot be interpreted by other units in the system, i.e. a response message from a unit may only be interpreted by the controlling unit 101.

The controlling unit 101 then establishes a working communication session with a unit connected to a port on the controlling unit 101. This establishment of a communication session may use one address from a pool (i.e. a predetermined set) of addresses. Such an address pool can for each type of unit be calculated from the address bits supplied by a hub unit (having at least two ports with different offset addresses but with a shared communication mechanism). The controlling unit 101 may then retrieve topology related attributes from the unit.

Examples of topology related attributes that may be retrieved from the unit include whether the unit is a controlling unit or a controlled unit. Other attributes define a number of ports [1 . . . n] on the unit. It is to be noted that a unit with only one port is typically a controlling unit or a controlled unit connected to a controlled unit with several ports acting as a hub. The ports on a unit may have attributes such as grouped [true, false]. An example of port attributes for a unit with hub functionality/several connectors (e.g. a cabinet hub unit with star connected shelves) may be: Shelf 1, Shelf 2 . . . Shelf(n) (string typed) and Cabinet left, Cabinet right (string typed). Example of port attributes for a unit with hub functionality/several connectors (e.g. a daisy chained shelf hub unit) may be: Shelf unit 1, Shelf unit 2 . . . Shelf unit (n) (string typed) and Up, down, (string typed) (for daisy chained connection).

After finding a unit, i.e. when a working communication session has been established, the controlling unit 101 may remove the used address for communication from the address pool for the found type of unit. For units with cascading ports the controlling unit may order the unit to allow message passing from the controller output on a specific port on the unit. These mechanisms allow further units to be found in later steps of discovery without address collisions.

These operations may be iterated until the controlling unit 101 no longer finds more units. Then the system topology, i.e. addresses as well as topology related attributes as exemplified above, is discovered and the controlling unit 101 has gained fully functional communication to all units. The system 100 is ready for the normal operational tasks involving all connected units operating according to their respective specifications (that are outside the scope of the present disclosure).

Figure 2:
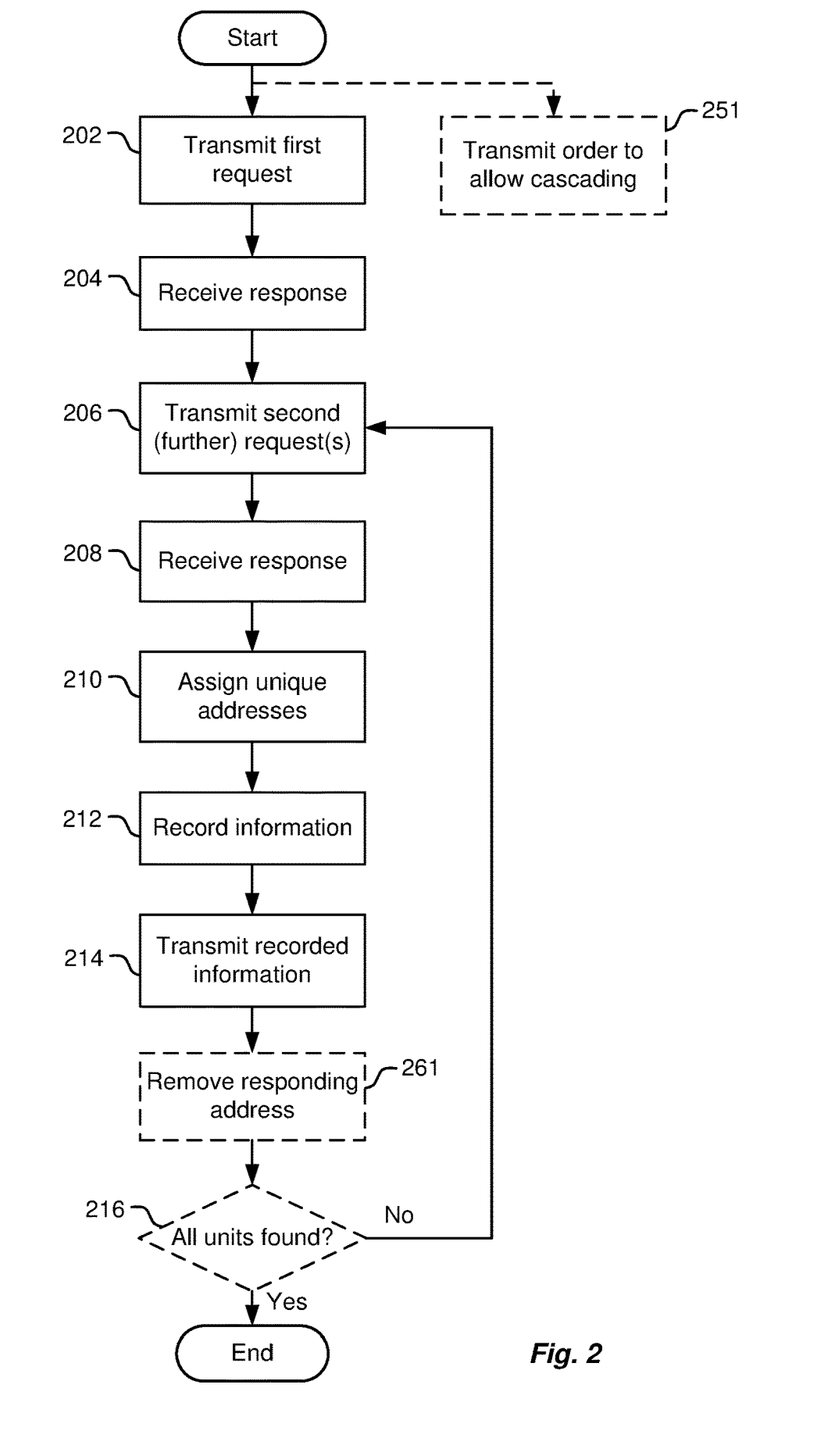
FIGS. 2-5 are flowcharts of embodiments of methods.

Turning now to FIG. 2, and with continued reference to FIG. 1, an embodiment of a method performed by a controlling unit, such as the controlling unit 101 in FIG. 1, will be described. The method in FIG. 2 is an embodiment of actions performed to realize at least some of the operations described above in connection with FIG. 1. That is, the controlling unit 101 performs the method in a system 100 of interconnected units 101, 102, 103, 104, 105 where each of the units comprises at least one port 106 via which the interconnection is realized and where at least a subset of the interconnected units comprises at least one cascading port. The method comprises a system start-up procedure that comprises a number of actions as follows:

Action 202

The controlling unit 101 transmits at least one first request for information to at least one port 106 on the controlling unit 101.

As will be exemplified below, this may entail transmitting the first request to an address selected from a predetermined set (e.g. "a pool" of addresses).

Action 204

The controlling unit 101 receives, from a first unit 102, a response to the first request. The response comprises information that identifies the first unit 102 and the information further comprises information that identifies at least one cascading port 106 on the first unit 102.

Action 206

The controlling unit 101 transmits a second request for information to the at least one cascading port 106 on the first unit 102.

Action 208

The controlling unit 101 receives, from a second unit 103, a response to the second request. This response comprises information that identifies the second unit 103 and the information further comprises information that identifies any cascading port on the second unit 103.

Action 210

The controlling unit 101 assigns a respective unique address associated with the first unit 102 and the second unit 103.

An alternative to performing, in action 210, the assignment of respective unique addresses associated with the first unit 102 and the second unit 103 is to make the assignment related to the first unit 102 already after action 204 and prior to action 206.

Action 212

The controlling unit 101 records the assigned unique addresses together with the information that identifies the first and second units 102, 103 and the information that identifies at least one cascading port 106 on the first and second units 102, 103.

Action 214

The controlling unit 101 transmits the recorded unique addresses to the first unit 102 and to the second unit 103.

Action 216

In some embodiments, further requests are transmitted to further units after a check is made whether or not all units in the system have been found. That is, actions 206 to 214 are iterated wherein the controlling unit 101 transmits further requests to further cascading ports on further units; the controlling unit 101 receives, from these further units, a respective response comprising information that identifies respective further unit and the information further comprises respective information that identifies any cascading port on said respective further unit; the controlling unit 101 assigns a respective unique address associated with respective further unit and records the assigned unique addresses together with the information that identifies respective further unit; the controlling unit then transmits the recorded unique addresses to said respective further unit, whereupon the check in action 216 is performed.

In some embodiments, the iteration as described above may be performed such that any transmission, by the controlling unit 101, of any request for information comprises an iteration of transmissions to addresses selected from a predetermined set of addresses. In some of these embodiments, an address from which a response is received is removed from the predetermined set of addresses, as exemplified in FIG. 2 in the form of an optional action 261.

Some embodiments comprise transmitting, by the controlling unit 101, an order to a specific unit 102,103,104,105. This order comprises information for instructing the specific unit 102,103,104,105 to allow a request transmitted by the controlling unit 101 to be transmitted on a cascading port on the specific unit 102,103,104,105. This is illustrated in FIG. 2 in the form of an optional action 251.

As will be exemplified in further detail below, in some embodiments any address may comprise a respective first address part defined by a type of unit and a second address part defined by an address offset that is port related. For example, the first address part may be a base address and the seconds address part may be in the form of address offset bits (AOB).

During a system startup, as exemplified above, address assignment data is spread to the units. Thus it is important that the controlling unit 101 always can recover from a system event that might cause address collision that prevents the controller to gain full control of all physically connected units. Such a system event may be, e.g., accidental disconnection of power or signal cables. Such recovery procedures are exemplified in the following.

Figure 3:
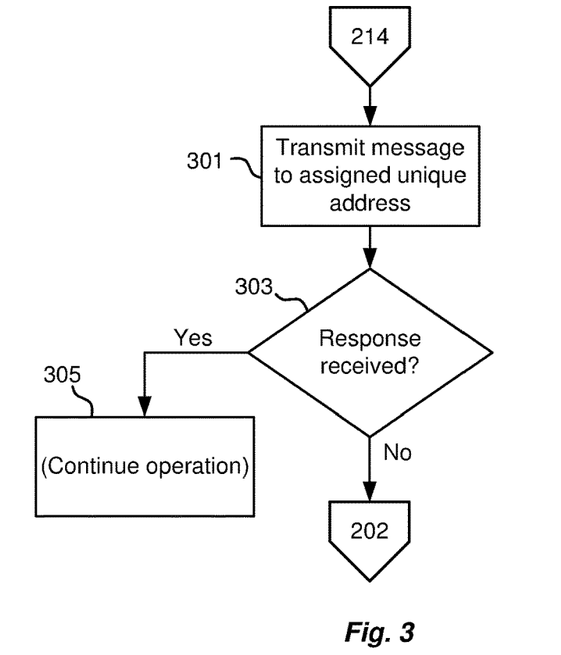

In a first example, a unit with cascading ports, e.g. a hub unit, has been reset and has forgotten any address assignment. The reason can be that the unit decides that the controlling unit 101 no longer is in control of the system 100 or the reason may be due to a too long power feeding loss. The controlling unit can detect this event because the unit no longer uses its assigned address and that all communication to all units connected, i.e. cascaded, to the unit will be lost (i.e. message passing is reset). The controlling unit 101 may perform a normal system startup for the whole system 100 or only a failed part of the system 100 to recover from such an event. FIG. 3 illustrates an embodiment of such a procedure:

Action 301

After having performed a procedure as illustrated in FIG. 2, the controlling unit 101 transmits a message to any of the unique addresses.

Action 303

A check is made where the controlling unit 101 determines whether or not a response to the transmitted message is received. If no response is received the consequence is to perform the start-up procedure again.

Action 305

If a response is received, normal operation of the system 100 continues.

Figure 4:
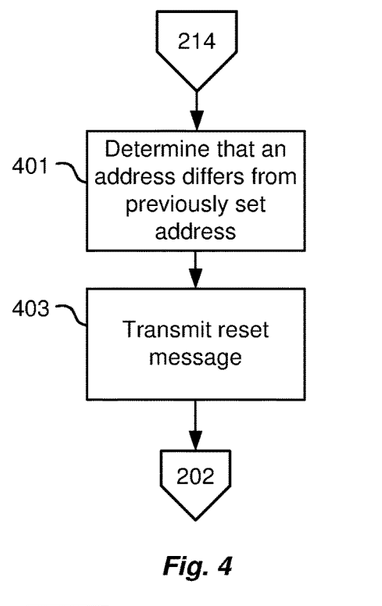

In a second example, the controlling unit 101 has for some reason restarted and at the same time one or more units still are configured (i.e. using a previous address assignment). The normal system topology discovery and address assignment procedure (i.e. a procedure as described above in connection with FIG. 2) may consider this case. The controlling unit 101 may detect this situation when it at starts up and finds a unit with an address assignment that differs from a default address (default address will be discussed further below). The controlling unit 101 may for each such found unit order the unit to reset itself. After this the system 100 can be restart in the normal way by a procedure as exemplified above in connection with FIG. 2. FIG. 4 illustrates an embodiment of such a procedure:

Action 401

After having performed a procedure as illustrated in FIG. 2, the controlling unit 101 determines that a unit is associated with an address that differs from a previously set address. For example, a scan may be performed of a pool of addresses and during such a scan it may be checked whether or not a previously set address has been used.

Action 403

As a consequence of the determination in action 401, the controlling unit 101 transmits a reset message to the unit associated with an address that differs from a previously set address, the reset message comprising an order to replace said address that differs from a previously set address with a default address, whereupon the start-up procedure (as described above in connection with FIG. 2) is performed.

The default address may be a base address that is unique for each type of controlled unit. Same types of units may be distinguished between by adding an offset address to the base address. The offset address may be hardware assigned through different addresses on hub ports (i.e. a static addressing mechanism) or software assigned by the controlling unit (i.e. a dynamic addressing mechanism).

Figure 5:
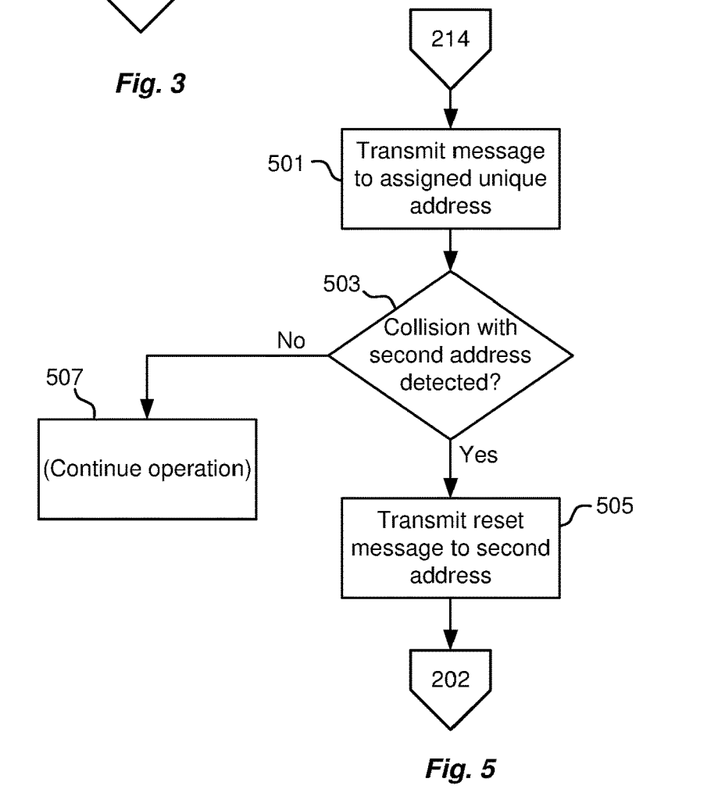

In a third example, after a success full system startup (as described above in connection with FIG. 2), a same type of unit is connected to the corresponding connector port with the same address bits as an already connected unit to a second unit, the addresses will collide and make the communication impossible with these units. The controlling unit 101 will notice this by detecting that the communication with an already connected unit fails due to these address collisions. The controlling unit 101 may then try to disconnect the same unit from the second unit and start to look for new units again. The result of this search will result in that two units are found and can be connected. If no units are found then the unit is truly physically disconnected. FIG. 5 illustrates an embodiment of such a procedure:

Action 501

After having performed a procedure as illustrated in FIG. 2, the controlling unit 101 transmits a message to a first address among the assigned unique addresses.

Action 503

The controlling unit 101 determines that an address collision occurs in relation to a second address. For example, the fact that an address collision has occurred may be determined by finding that no readable response message is received, e.g. within a predetermined time-out period.

Action 505

As a consequence of the determination, in action 503, that an address collision occurs, the controlling unit 101 transmits a reset message to the second address. The reset message comprises an order to replace said second address with a default address, whereupon the start-up procedure (as described above in connection with FIG. 2) is performed.

Action 507

If no address collision is determined in action 503, the system 100 continues normal operation.

In some embodiments, the units 101, 102, 103, 104, 105 in the system 100 may be configured to interconnect according to a high level data link control, HDLC, protocol and wherein any transmission of a request for information comprises transmitting a HW_PID_REQ message and wherein any response to any HW_PID_REQ is a HW_PID_CFM message. That is, a HW_PID_REQ message relates to requesting product information data (PID) and a HW_PID_CFM message relates to a confirmation (CFM).

The information part of an HDLC frame, i.e. a HDLC message, are shown in table 1.

TABLE 1

| Flag | Address | Control | Information | Frame check sequence (FCS) | Flag |
|---|---|---|---|---|---|
| 8 bits | 8 or more bits | 8 or 16 bits | Variable length, 0 or more bits | 16 or 32 bits | 8 bits |

The controlling unit may send a message (e.g. actions 202 and 208 in FIG. 2) asking for information about the connected unit in the information part of the frame. As illustrated above, the controlling unit 101 may have to test for success using possible addresses used by a controlled unit. The controlling unit 101 knows the type of units it may have to control and how many address offset bytes it uses. Thus the controlling unit 101 knows all possible HDLC addresses that may exist in the system 100. Table 2 is an example of such addresses.

TABLE 2

| Unit type | Function | HDLC base address (Hex) | Number of address offset bits |
|---|---|---|---|
| FCU | Fan Control Unit | 20 | 4 |
| PSU | Power Supply Unit | 30 | 4 |
| BFU | Battery Fuse Unit | 40 | 4 |
| EMU | Energy measuring unit | 50 | 4 |
| CHU | Controllable HUB | 60 | 4 |

As mentioned above, the HW_PID_REQ message may be used to request the unit to return the HW PID, as table 3 illustrates.

TABLE 3

| Information Element: | Data Type | Length [Octets] |
|---|---|---|
| MESSAGE_NUMBER | U8 | 1 |

The message number is the first octet in the information part of the HDLC formatted HW_PID_REQ message. Only the unit allocated with this address number (based on unit type and address offset bits) will respond with a HW_PID_CFM message.

The HW_PID_CFM message may return the HW PID with information elements according to table 4.

TABLE 4

| Information Element: | Data Type | Length [Octets] |
|---|---|---|
| MESSAGE_NUMBER | U8 | 1 |
| PRODUCT_NUMBER | String | P_ID_LENGTH |
| REV_STATE | String | P_REV_LENGTH |
| PRODUCT_NAME | String | P_NAME_LENGTH |
| PRODUCTION_DATE | String | P_DATE_LENGTH |
| SERIAL_NUMBER | String | P_SERIAL_LENGTH |

If the unit has several ports contained, i.e. it is a hub unit, it will add a number of ports and ports attributes in the response as exemplified above in connection with FIG. 1.

Below follows examples of final results of a start-up procedure, operating in a HDLC context, as exemplified above. The results are illustrated in the form of tables recorded in, e.g., action 212 of FIG. 2.

For a trivial system without cascading or configurable hub units the result of a start-up procedure may be in the form of a recorded table (table 5).

TABLE 5

| Unit type | Address offset bits (AOB) | Address | Contained ports | Address domain* |
|---|---|---|---|---|
| FCU | 1 | 20 + 1 | 0 | 1 |
| PSU | 3 | 30 + 3 | 0 | 1 |
| PSU | 2 | 30 + 2 | 0 | 1 |
| BFU | 4 | 40 + 4 | 0 | 1 |

An address domain contains a number of offset addresses that are HW assigned through different addresses on hub ports.

For a more complex system, e.g. a system 100 such as that in FIG. 1 comprising a hub unit a recorded table may then contain the following (table 6).

TABLE 6

| Unit type | AOB | Address | Contained ports | Address domain |
|---|---|---|---|---|
| FCU | 1 | 20 + 1 | 0 | 1 |
| PSU | 3 | 30 + 3 | 0 | 1 |
| PSU | 2 | 30 + 2 | 0 | 1 |
| BFU | 4 | 40 + 4 | 0 | 1 |
| CHU | 5 | 50 + 5 | 5 | 1 |

In such a case, the recorded information further comprises a table (table 7) that provides information related to the hub unit having 5 ports (the unit in the above table having AOB 5).

TABLE 7

| Port number | Unit type | AOB | Address | Contained ports | Address domain |
|---|---|---|---|---|---|
| 1 | controller | n/a | fixed | — | 1 |
| 2 | PSU | 1 | 30 + 1 | 0 | 1 |
| 3 | PSU | 4 | 30 + 4 | 0 | 1 |
| 4 | BFU | 5 | 40 + 5 | 0 | 1 |

Figure 6:
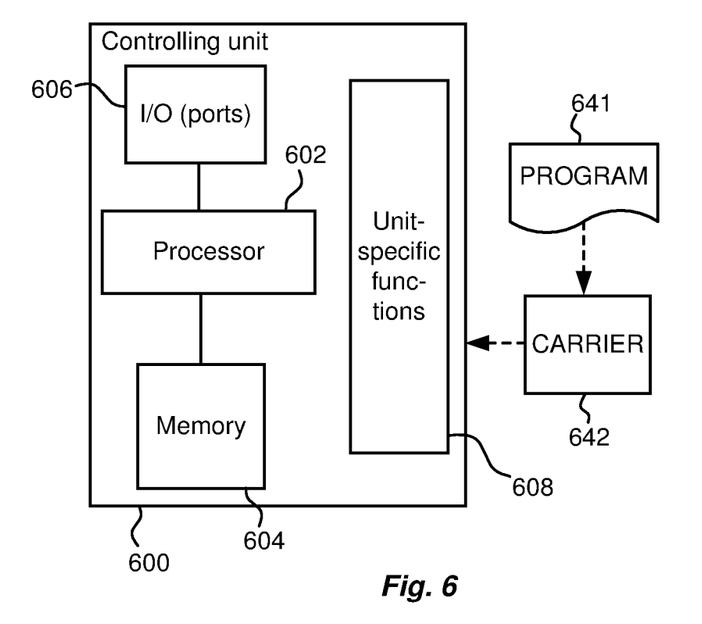
FIG. 6 schematically illustrates a block diagram of a controlling unit.

Turning now to FIG. 6, a controlling unit 600 will be described in some more detail. The controlling unit 600 may correspond to any unit in FIG. 1, for example the controlling unit 101. As discussed above, the controlling unit 600 may be a transmitter, a receiver, a power supply units, a fan control unit etc. that need to communicate on the data link layer in a communication system such as the system 100 in FIG. 1. In FIG. 6, unit specific functions 608 represent any functionality of the controlling unit 600 that are not essential for the present disclosure, e.g. power circuits in a power supply unit etc.

The controlling unit 600 comprises input/output circuitry 606, which may correspond to one or more ports as discussed above, a processor 602 and a memory 604. The memory 604 contains instructions executable by the processor 602 whereby the controlling unit 600 is operative to:
- transmit at least one first request for information to at least one port on the controlling unit,
- receive, from a first unit, a response to said first request, said response comprising information that identifies the first unit, the information further comprising information that identifies at least one cascading port on the first unit,
- transmit a second request for information to said at least one cascading port on the first unit,
- receive, from a second unit, a response to said second request, said response comprising information that identifies the second unit, the information further comprising information that identifies any cascading port on the second unit,
- assign a respective unique address associated with the first unit and the second unit,
- record the assigned unique addresses together with the information that identifies the first and second units and the information that identifies at least one cascading port on the first and second units, and
- transmit the recorded unique addresses to the first unit and to the second unit.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

In some embodiments, the controlling unit 600 is operative to:
- transmit further requests to further cascading ports on further units,
- receive, from said further units, a respective response comprising information that identifies said respective further unit, the information further comprising respective information that identifies any cascading port on said respective further unit,
- assign a respective unique address associated with said respective further unit,
- record the assigned unique addresses together with the information that identifies said respective further unit, and
- transmit said recorded unique addresses to said respective further unit.

In some embodiments, the controlling unit 600 is operative to:
- transmit an order to a specific unit, said order comprising information for instructing said specific unit to allow a request transmitted by the controlling unit to be transmitted on a cascading port on said specific unit.

In some embodiments, the controlling unit 600 is operative such that any address comprises a respective first address part defined by a type of unit and a second address part defined by an address offset that is port related.

In some embodiments, the controlling unit 600 is operative such that any transmission of any request for information comprises an iteration of transmissions to addresses selected from a predetermined set of addresses.

In some embodiments, the controlling unit 600 is operative to:
- remove, from the predetermined set of addresses, an address from which a response is received.

In some embodiments, the controlling unit 600 is operative to, subsequent to the system start-up procedure:
- transmit a message to any of said unique addresses,
- determine that no response to the transmitted message is received and as a consequence performing the start-up procedure.

In some embodiments, the controlling unit 600 is operative to:
- determine that a unit is associated with an address that differs from a previously set address and, as a consequence:
- transmit a reset message to said unit associated with an address that differs from a previously set address, the reset message comprising an order to replace said address that differs from a previously set address with the default address, and
- perform the start-up procedure.

In some embodiments, the controlling unit 600 is operative to, subsequent to the system start-up procedure:
- transmit a message to a first address among the assigned unique addresses,
- determine that an address collision occurs in relation to a second address and, as a consequence:
- transmit a reset message to said second address, the reset message comprising an order to replace said second address with a default address, and
- perform the start-up procedure.

In some embodiments, the controlling unit 600 is operative such that the units in the system are configured to interconnect according to a high level data link control, HDLC, protocol and wherein any transmission of a request for information comprises transmitting a HW_PID_REQ message and wherein any response to any HW_PID_REQ is a HW_PID_CFM message.

Figure 7:
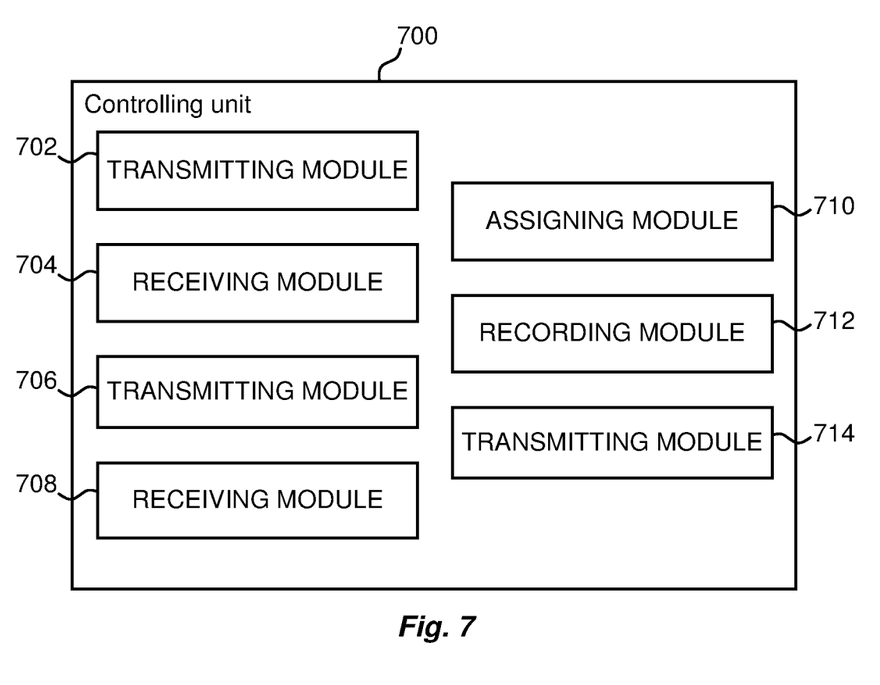
FIG. 7 schematically illustrates a block diagram of a controlling unit.

Turning now to FIG. 7, a controlling unit 700 will be described in some more detail. The controlling unit 700 may correspond to any unit in FIG. 1, for example the controlling unit 101. As discussed above, the controlling unit 700 may be a transmitter, a receiver, a power supply units, a fan control unit etc. that need to communicate on the data link layer in a communication system such as the system 100 in FIG. 1. Although not shown in FIG. 7, the controlling unit 700 may comprise unit specific functions that are not essential for the present disclosure, e.g. power circuits in a power supply unit etc.

The controlling unit 700 comprises:
- a transmitting module 702 configured to transmit at least one first request for information to at least one port on the controlling unit,
- a receiving module 704 configured to receive, from a first unit, a response to said first request, said response comprising information that identifies the first unit, the information further comprising information that identifies at least one cascading port on the first unit,
- a transmitting module 706 configured to transmit a second request for information to said at least one cascading port on the first unit, a receiving module 708 configured to receive, from a second unit, a response to said second request, said response comprising information that identifies the second unit, the information further comprising information that identifies any cascading port on the second unit, an assigning module 710 configured to assign a respective unique address associated with the first unit and the second unit, a recording module 712 configured to record the assigned unique addresses together with the information that identifies the first and second units and the information that identifies at least one cascading port on the first and second units, and a transmitting module 714 configured to transmit the recorded unique addresses to the first unit and to the second unit.

The controlling unit 700 may comprise further modules that are configured to perform in a similar manner as, e.g., the controlling unit 600 described above in connection with FIG. 6.

The invention claimed is:

1. A method performed by a controlling unit in a system of interconnected units, wherein each of said interconnected units comprises at least one port via which an interconnection between said interconnected units is realized, and wherein at least a subset of said interconnected units comprises at least one cascading port, said method comprising a system start-up procedure that comprises:
 transmitting at least one first request for information to at least one port on the controlling unit, the controlling unit being connected to a first unit via said at least one port on the controlling unit,
 receiving, from the first unit, a response to said at least one first request, said response comprising information that identifies the first unit, the information further comprising information that identifies at least one cascading port on the first unit,
 transmitting a second request for information to said at least one cascading port on the first unit,
 receiving, from a second unit, a response to said second request, said response comprising information that identifies the second unit, the information further comprising information that identifies a cascading port on the second unit,
 assigning a respective unique address associated with the first unit and the second unit wherein the second unit is connected to the first unit via said at least one cascading port on the first unit,
 recording the assigned unique addresses together with the information that identifies the first unit and the second unit and the information that identifies said at least one cascading port on the first unit and said cascading port on the second unit, and
 transmitting the recorded unique addresses to the first unit and to the second unit.

2. The method of claim 1, further comprising:
 transmitting further requests to further cascading ports on further units,
 receiving, from said further units, a respective response comprising information that identifies a respective further unit, the information further comprising respective information that identifies any cascading port on said respective further unit,
 assigning a respective unique address associated with said respective further unit,
 recording the assigned unique addresses associated with said respective further unit together with the information that identifies said respective further unit, and
 transmitting said recorded unique addresses associated with said respective further unit to said respective further unit.

3. The method of claim 1, further comprising:
 transmitting an order to a specific unit, said order comprising information for instructing said specific unit to allow a request transmitted by the controlling unit to be transmitted on a cascading port on said specific unit.

4. The method of claim 1, wherein any address comprises a respective first address part defined by a type of unit and a respective second address part defined by an address offset that is port related.

5. The method of claim 1, wherein any transmission of any request for information comprises an iteration of transmissions to addresses selected from a predetermined set of addresses.

6. The method of claim 5, further comprising:
 removing, from the predetermined set of addresses, an address from which a response is received.

7. The method of claim 1, further comprising subsequent to the system start-up procedure:
 transmitting a message to any of said unique addresses,
 determining that no response to the transmitted message is received and as a consequence performing the system start-up procedure.

8. The method of claim 1, further comprising:
 determining that a unit is associated with an address that differs from a previously set address, and as a consequence:
  transmitting a reset message to said unit associated with the address that differs from the previously set address, the reset message comprising an order to replace said address that differs from the previously set address with a default address, and
  performing the system start-up procedure.

9. The method of claim 1, further comprising subsequent to the system start-up procedure:
 transmitting a message to a first address among the assigned unique addresses,
 determining that an address collision occurs in relation to a second address, and as a consequence:
  transmitting a reset message to said second address, the reset message comprising an order to replace said second address with a default address, and
  performing the system start-up procedure.

10. The method of claim 1, wherein the interconnected units in the system are configured to interconnect according to a high level data link control (HDLC) protocol, wherein a transmission of a request for information comprises transmitting a HW_PID_REQ message, and wherein a response to any HW_PID_REQ message is a HW_PID_CFM message.

11. A controlling unit for use in a system of interconnected units, the controlling unit comprising:
 input/output circuitry,
 a processor, and
 a memory, said memory containing instructions which, when executed by said processor, instruct said controlling unit to perform a system start-up procedure operative to:
  transmit at least one first request for information to at least one port on the controlling unit, the controlling unit being connected to a first unit via said at least one port on the controlling unit, receive, from the first unit, a response to said at least one first request, said response comprising information that identifies the first unit, the information further comprising information that identifies at least one cascading port on the first unit, transmit a second request for information to said at least one cascading port on the first unit, receive, from a second unit, a response to said second request, said response comprising information that identifies the second unit, the information further comprising information that identifies a cascading port on the second unit, assign a respective unique address associated with the first unit and the second unit, wherein the second unit is connected to the first unit via said at least one cascading port on the first unit, record the assigned unique addresses together with the information that identifies the first unit and the second unit and the information that identifies said at least one cascading port on the first unit and said cascading port on the second unit, and transmit the recorded unique addresses to the first unit and to the second unit.

12. The controlling unit of claim 11, wherein the instructions which, when executed by the processor, further instructs the controlling unit to be operative to:

transmit further requests to further cascading ports on further units, receive, from said further units, a respective response comprising information that identifies a respective further unit, the information further comprising respective information that identifies any cascading port on said respective further unit, assign a respective unique address associated with said respective further unit, record the assigned unique addresses associated with said respective further unit together with the information that identifies said respective further unit, and transmit said recorded unique addresses associated with said respective further unit to said respective further unit.

13. The controlling unit of claim 11, wherein the instructions which, when executed by the processor, further instructs the controlling unit to be operative to:

transmit an order to a specific unit, said order comprising information for instructing said specific unit to allow a request transmitted by the controlling unit to be transmitted on a cascading port on said specific unit.

14. The controlling unit of claim 11, wherein the instructions which, when executed by the processor, further instructs the controlling unit to be operative, such that any address comprises a respective first address part defined by a type of unit and a respective second address part defined by an address offset that is port related.

15. The controlling unit of claim 11, wherein the instructions which, when executed by the processor, further instructs the controlling unit to be operative, such that any transmission of any request for information comprises an iteration of transmissions to addresses selected from a predetermined set of addresses.

16. The controlling unit of claim 15, wherein the instructions which, when executed by the processor, further instructs the controlling unit to be operative to:

remove, from the predetermined set of addresses, an address from which a response is received.

17. The controlling unit of claim 11, wherein the instructions which, when executed by the processor, further instructs the controlling unit to be operative to, subsequent to the system start-up procedure:

transmit a message to any of said unique addresses, determine that no response to the transmitted message is received and as a consequence performing the system start-up procedure.

18. The controlling unit of claim 11, wherein the instructions which, when executed by the processor, further instructs the controlling unit to be operative to:

determine that a unit is associated with an address that differs from a previously set address and as a consequence:

transmit a reset message to said unit associated with the address that differs from the previously set address, the reset message comprising an order to replace said address that differs from the previously set address with a default address, and perform the system start-up procedure.

19. The controlling unit of claim 11, wherein the instructions which, when executed by the processor, further instructs the controlling unit to be operative to, subsequent to the system start-up procedure:

transmit a message to a first address among the assigned unique addresses, determine that an address collision occurs in relation to a second address, and as a consequence:

transmit a reset message to said second address, the reset message comprising an order to replace said second address with a default address, and perform the system start-up procedure.

20. The controlling unit of claim 11, wherein the instructions which, when executed by the processor, further instructs the controlling unit to be operative, such that the interconnected units in the system are configured to interconnect according to a high level data link control (HDLC) protocol wherein a transmission of a request for information comprises transmitting a HW_PID_REQ message, and wherein a response to any HW_PID_REQ message is a HW_PID_CFM message.

21. A non-transitory computer readable storage medium containing instructions which, when executed on at least one processor in a controlling unit for use in a system of interconnected units, cause the controlling unit to perform operations, including a system start-up procedure comprising:

transmitting at least one first request for information to at least one port on the controlling unit, the controlling unit being connected to a first unit via said at least one port on the controlling unit, receiving, from the first unit, a response to said at least one first request, said response comprising information that identifies the first unit, the information further comprising information that identifies at least one cascading port on the first unit, transmitting a second request for information to said at least one cascading port on the first unit, receiving, from a second unit, a response to said second request, said response comprising information that identifies the second unit, the information further comprising information that identifies a cascading port on the second unit, assigning a respective unique address associated with the first unit and the second unit wherein the second unit is connected to the first unit via said at least one cascading port on the first unit, recording the assigned unique addresses together with the information that identifies the first unit and the second unit and the information that identifies said at least one cascading port on the first unit and said cascading port on the second unit, and transmitting the recorded unique addresses to the first unit and to the second unit.

\* \* \* \* \*